(12) United States Patent
LeCrone et al.

(10) Patent No.: US 10,133,505 B1
(45) Date of Patent: Nov. 20, 2018

(54) COOPERATIVE HOST AND DATA STORAGE SYSTEM SERVICES FOR COMPRESSION AND ENCRYPTION

(71) Applicant: EMC IP Holding Company LLC, Hopkinton, MA (US)

(72) Inventors: Douglas E. LeCrone, Hopkinton, MA (US); Paul A. Linstead, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 19 days.

(21) Appl. No.: 15/279,749

(22) Filed: Sep. 29, 2016

(51) Int. Cl.
*G06F 3/06* (2006.01)
*G06F 13/10* (2006.01)

(52) U.S. Cl.
CPC .......... *G06F 3/0647* (2013.01); *G06F 3/0613* (2013.01); *G06F 3/0673* (2013.01); *G06F 13/102* (2013.01)

(58) Field of Classification Search
CPC .... G06F 3/0647; G06F 3/0613; G06F 3/0673; G06F 13/102
See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 6,954,835 B1 | 10/2005 | LeCrone et al. | |
| 6,986,009 B1 | 1/2006 | LeCrone et al. | |
| 7,054,883 B2 | 5/2006 | Meiri et al. | |
| 7,707,186 B2 | 4/2010 | LeCrone et al. | |
| 8,335,899 B1 | 12/2012 | Meiri et al. | |
| 9,176,975 B2 * | 11/2015 | Koifman | G06F 3/0623 |
| 2010/0020825 A1 * | 1/2010 | Bass | H04L 69/04 370/477 |
| 2010/0318684 A1 * | 12/2010 | Fallon | G06F 3/0608 709/247 |
| 2010/0332700 A1 * | 12/2010 | Fallon | G06F 3/0613 710/68 |
| 2011/0113432 A1 * | 5/2011 | Ergan | G06F 12/0802 718/103 |
| 2011/0302383 A1 * | 12/2011 | Ignatius | G06F 3/0613 711/162 |

(Continued)

*Primary Examiner* — Nimesh G Patel
(74) *Attorney, Agent, or Firm* — Muirhead and Saturnelli, LLC

(57) ABSTRACT

Multiple hardware and/or software components across the host and data storage system may be capable of performing data transformation operations. In at least one embodiment, a particular one of the multiple components may be selected, per I/O operation and using information generated by a component selection tool, to perform a data transformation operation. For an I/O operation, a first component may be selected to perform a first data transformation operation and a second different component may be selected to perform a second data transformation operation. The first and second components may both be on the host, both on the data storage system, or on different ones of the host and data storage system. A host I/O driver may create a request for the I/O operation where the request includes indicators identifying the first and second components as selected for performing the data transformation operations.

19 Claims, 12 Drawing Sheets

(56) References Cited

U.S. PATENT DOCUMENTS

| | | | |
|---|---|---|---|
| 2014/0115656 A1* | 4/2014 | Kim | G06F 21/78 726/1 |
| 2014/0215170 A1* | 7/2014 | Scarpino | G06F 3/0608 711/161 |
| 2017/0153844 A1* | 6/2017 | Kwon | G06F 3/0647 |
| 2017/0317991 A1* | 11/2017 | Lionetti | H04L 63/0471 |

* cited by examiner

US 10,133,505 B1

COOPERATIVE HOST AND DATA STORAGE SYSTEM SERVICES FOR COMPRESSION AND ENCRYPTION

BACKGROUND

Technical Field

This application generally relates to data storage and more particularly to techniques used in connection with data compression and encryption services.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform I/O (input/output) operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, hosts and other components may be interconnected by one or more communication connections such as in a network configuration. The network may support transmissions in accordance with well-known protocols such as TCP/IP (Transmission Control Protocol/Internet Protocol), UDP (User Datagram Protocol), and the like. Networked storage systems, such as data storage arrays, may be used to maintain data on different systems in different locations.

SUMMARY OF THE INVENTION

In accordance with one aspect of techniques herein is a method of processing I/O operations comprising: receiving, on a host, a first I/O operation; creating, on the host, a first request for the first I/O operation, the first request including a first indicator identifying a first component of a plurality of components selected to perform one or more data transformation operations including any of encryption, decryption, compression and decompression, wherein the plurality of components include at least one component on the host and at least one component on the data storage system; and sending, from the host to a data storage system, the first request to perform the I/O operation. The first component may include any of hardware and software used to perform the one or more data transformation operations. An I/O driver of the host may create the first request and may set the first indicator in the first request. The method may include determining a first component set of one or more of the plurality of components, wherein each component of the first component set is capable of performing at least one of the one or more data transformation operations; and selecting the first component from the first component set. The first component set may include less than all of the plurality of components. The first component may be selected in accordance with one or more inputs including information identifying which of the plurality of components are capable of performing each of the one or more data transformation operations. The I/O operation may be directed to a target location and the one or more data transformation operations may include compression. Each component of the first component set may be capable of performing compression and decompression, and the first component may be selected to perform compression as indicated by the first indicator. The one or more inputs may include compression analysis information identifying, for the target location, a compressibility factor for each component of the first component set whereby said compressibility factor denotes an amount by which said each component compresses, or is expected to compress, first data stored at the target location. The one or more inputs may include load balancing and resource utilization information of any of the host, the data storage system, and a network or connection between the host and data storage system over which the first I/O operation is transmitted. The one or more inputs may include at least one policy comprising one or more criteria specifying when the one or more data transformation operations are to be performed. The one or more inputs may include data access information identifying when particular data portions are expected to be accessed. The one or more inputs may include user input indicating, for at least one data portion, a particular one of the plurality of components is to be used in connection with performing any of the one or more data transformation operations. The one or more inputs may be provided to a component selection tool that produces data transformation hint information comprising mapping information. The mapping information may identify particular ones of the plurality of components selected to perform the one more data transformation operations for different data portions. An I/O driver of the host may create the first request and may select the first component using the mapping information. The first indicator may indicate that the first component is selected to perform compression and the first request may also include a second indicator indicating that a second of the plurality of components is selected to perform encryption. The method may include performing compression by the first component in accordance with the first indicator of the first request; and performing encryption by the second component in accordance with the second indicator of the first request.

In accordance with another aspect of techniques herein is a system comprising: one or more processors; and a memory comprising code stored thereon that, when executed by at least one of the one or more processors, performs a method of processing I/O operations comprising: receiving, on a host, a first I/O operation; creating, on the host, a first request for the first I/O operation, the first request including a first indicator identifying a first component of a plurality of components selected to perform one or more data transformation operations including any of encryption, decryption, compression and decompression, wherein the plurality of components include at least one component on the host and at least one component on the data storage system; and sending, from the host to a data storage system, the first request to perform the I/O operation.

In accordance with another aspect of the techniques herein is a computer readable medium comprising code stored thereon that, when executed, performs a method of processing I/O operations comprising: receiving, on a host, a first I/O operation; creating, on the host, a first request for the first I/O operation, the first request including a first indicator identifying a first component of a plurality of components selected to perform one or more data transformation operations including any of encryption, decryption, compression and decompression, wherein the plurality of components include at least one component on the host and at least one component on the data storage system; and sending, from the host to a data storage system, the first request to perform the I/O operation. The first component may include any of hardware and software used to perform the one or more data transformation operations. An I/O driver of the host may create the first request and may set the first indicator in the first request. The method may include determining a first component set of one or more of the plurality of components, wherein each component of the first component set is capable of performing at least one of the one or more data transformation operations; and selecting the first component from the first component set.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
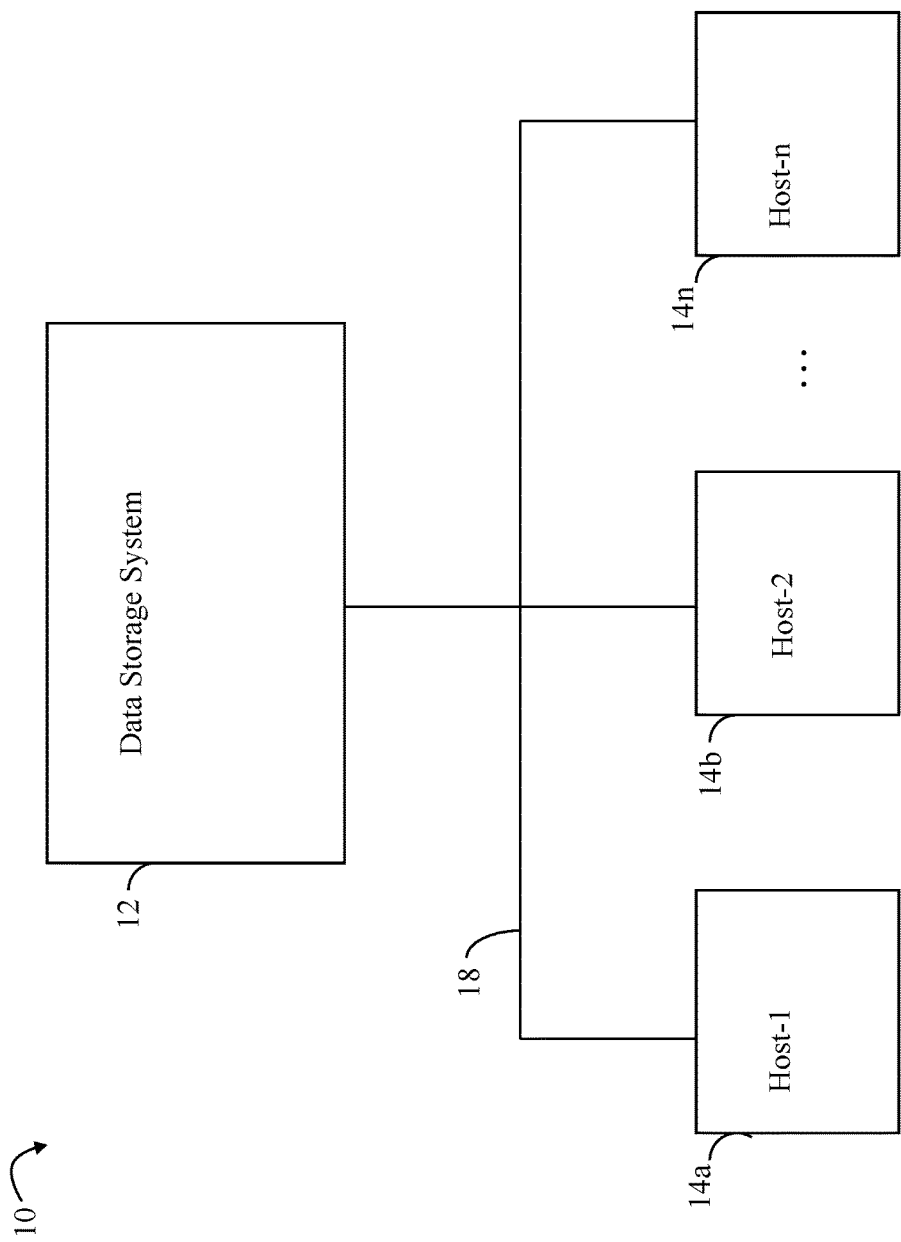
FIGS. 1, 2A, 2B, 3, 4, 6B, and 8 are examples of embodiments of systems and components that may utilize the techniques described herein.

Referring to FIG. 1, shown is an example of an embodiment of a system and components that may be used in performing the techniques described herein. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, an IBM mainframe computer system (as described in more detail elsewhere herein), or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, ESCON, Fibre Channel, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
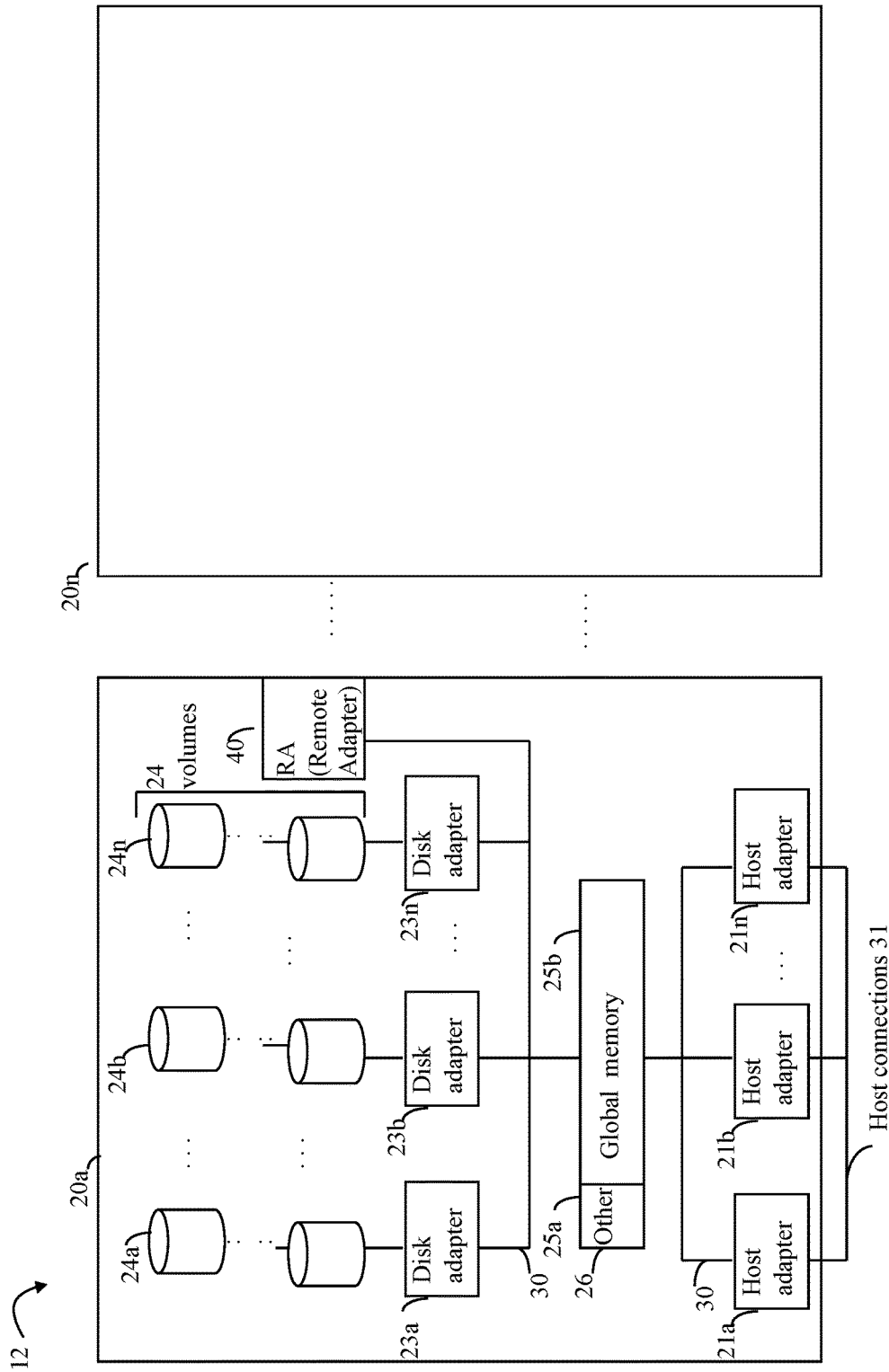

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices, such as disk devices or volumes, in an exemplary arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

Also shown in the storage system 20a is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over Fibre Channel transmission channel supporting messaging traffic between data storage systems. The RA may be hardware including a processor used to facilitate communication between data storage systems, such as between two Symmetrix® data storage systems. The RA may be used with the Symmetrix Remote Data Facility (SRDF®) products provided by EMC Corporation of Hopkinton, Mass. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein. In some instances, it may be desirable to copy data from a first logical storage device R1 of a first data storage system to another second logical storage device, such as R2, provided in a different remote site or location (e.g., second data storage system) so that if a disaster occurs that renders R1 inoperable, the host (or another host) may resume operation using the data of R2 at the remote site. Such a capability is provided, for example, by the SRDF® products provided by EMC Corporation of Hopkinton, Mass. Communication between Symmetrix™ data storage systems using SRDF® is described, for example, in U.S. Pat. Nos. 5,742,792, 5,544,347, and 7,054,883, and 8,335,899, all of which are incorporated by reference herein in their entirety. With SRDF®, a user may denote a first logical storage device, such as R1, as a source logical storage device and a second logical storage device, such as R2, as a target logical storage device. Other incarnations of SRDF® may provide a peer to peer relationship between the local and remote storage devices. In this example, the host interacts (e.g., issues I/O requests or commands) directly with the device R1 of the first (local or primary) data storage system, but any data changes made (e.g., such as due to writes to the logical device R1) are automatically provided to the R2 device of second remote data storage system using SRDF®. In operation, the host may read and write data using the R1 volume in the first data storage system and SRDF® may handle the automatic copying and updating of data from R1 to R2 in second data storage system.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable physical storage device (e.g., non-volatile physical data storage devices or PDs) such as a rotating disk drive, flash-based storage, and the like. The particular data storage system as described in this embodiment, or a particular device thereof, such as a rotating disk or solid state storage device (e.g., a flash-based storage device), should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. For example, one or more logical devices or volumes may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated physical storage devices or drive(s) and logical devices residing thereon.

I/O requests, such as read and write requests sent from a host to the data storage system, may be directed to a target address, such as a logical device and location (e.g., track, or more generally, logical address or offset) on the logical device. The target address may be mapped or translated into a corresponding physical storage location on physical storage storing the data for the corresponding target address. Such I/O requests from the host may be received by a front end director or adapter, such as the HA or FA described herein. The receiving FA may perform processing to service the I/O operation. Global memory, or a subset thereof, on the data storage system, may be used as the data cache (also referred to as simply as a cache herein). In at least one embodiment, write data received at the data storage system from a host or other client may be initially written to the cache (e.g., cache memory such as may be included in the component designated as 25b) and marked as write pending (WP). Once written to cache, the host may be notified that the write operation has completed. At a later point time, the write data marked as WP may be destaged from cache whereby the WP data is written to physical non-volatile storage, such as by a DA. If the I/O operation is a read request to read data from a logical device location, processing is performed to determine whether the requested read data is already stored in cache thereby resulting in a read hit. If there is a read hit, the FA may retrieve the requested read data from cache and return the requested read data to the host or other client that issued the read. If the read data is not stored in cache resulting in a read miss, a request is issued to retrieve the requested read data from physical storage. Data that is read from physical non-volatile storage devices, such as back-end physical storage devices accessed by the DAs, is then stored in the cache. The FA may retrieve the requested read data now stored in cache and return the requested read data to the host or other client that issued the read.

Figure 2B:
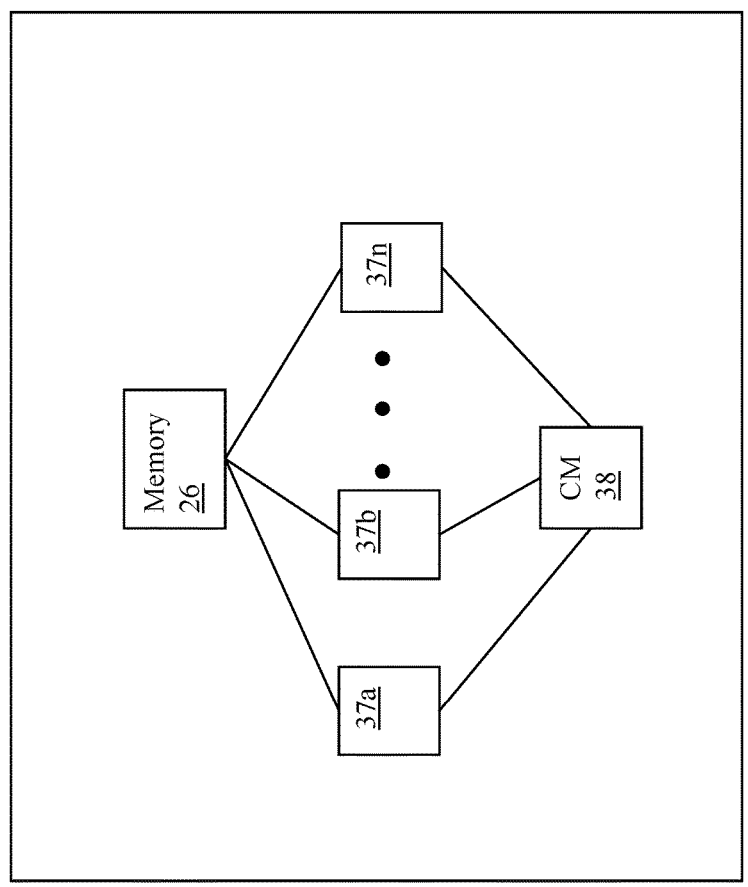

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

A host and/or data storage system in an embodiment in accordance with techniques herein may include one or more components that perform encryption/decryption (e.g., also referred to herein as encryption) and/or compression/decompression (e.g., also referred to herein as compression) of data. Generally, encryption/decryption compression/decompression may be referred to as data transformation operations. Each such component may embody encryption and/or compression techniques in hardware and/or software. For example, a data storage system may include a component that perform compression and a second component that performs encryption. A host may include one or more components that perform compression and also one or more components that perform encryption. In the data storage system and hosts, a single component may be used to perform both encryption and compression as well as different components depending on the embodiment. Different techniques for performing compression/decompression as well as encryption/decryption are well known in the art and any such techniques may be used in an embodiment herein. For example, encryption/decompression may be performed using asymmetric encryption using a public-private key encryption technique known in the art. In at least one embodiment in accordance with techniques herein where data is both encrypted and compressed, the data may first be compressed and then encrypted. Such data may be stored on non-volatile physical storage devices (e.g., PDs 24) of the data storage system in its compressed and/or encrypted form. In a typical or normal processing case, the data may be decrypted and/or decompressed when the data is retrieved from physical storage, such as in response to a data cache read miss. Depending on the embodiment, may be other instances where the data may be compressed and/or decrypted other than in response to a data cache read miss.

In connection with an environment such as illustrated in FIG. 1 and others herein, it is common to have components that perform compression/decompression and encryption/decryption on both hosts and also the data storage systems. In such environments, it is wasteful in terms of resources and processing time for the host or data storage system to attempt compression and/or encryption on data that is already in a required compressed and/or encrypted form. Additionally, in cases where multiple components have the ability/capability to perform encryption and compression, it is desirable to determine and select the best component to perform encryption and compression. Described in following paragraphs are techniques that may be used in an embodiment herein where a high level application, such as the component selection tool described below, which has knowledge regarding the particular host and data storage system components capable of performing encryption and/or compression. In such an embodiment, the high level application may reside on a host and may orchestrate which components perform any desired or required encryption and/or compression.

In at least one embodiment, a compression analysis tool may be used to determine a compressibility factor with respect to a particular data set or data portion and one or more compression techniques each used by a different host or data storage system component. For example, the tool may examine the data portion, or at least some of the data portion, and determine the compressibility factor denoting an amount by which the data portion actually compresses, or is expected to compress, for the different compression techniques. For example, a first compression technique performed by a first component may have a compressibility factor indicating the data portion stored in its compressed form is 30% smaller in size than in uncompressed/decompressed form, and a second compression technique performed by a second component may have a compressibility factor indicating the data portion stored in its compressed form is 10% smaller in size than in uncompressed/decompressed form. In this case, the first compression technique/first component may be selected to perform compression rather than the second compression technique/second component due to the greater compression achieved by the first compression technique/first component. The foregoing information regarding the estimated or actual capacity savings for the different components that perform compression may be provided as an input used in connection with selecting one of the components to perform the compression where such components may reside on both the host and the data storage system. The foregoing is an example of one type of input that may be provided to the component selection tool described in following paragraphs that facilitates automated evaluation and selection of a particular component, from possibly multiple components, to perform compression, and also selection of a particular component, from possibly multiple components, to perform encryption. The foregoing and other details of techniques herein are described in following paragraphs.

It should be noted that embodiments in accordance with techniques herein may include components that perform one or more data transformation operations, such as any one or more of encryption, decryption, compression and decompression of data. A component performing one or more of the foregoing data transformation operations may be included on the host, the data storage system, or located between the host and the data storage system (e.g., on the I/O path between the host and data storage system). For example, one of the components performing a data transformation operation may be a switch (or included in the switch). As another example, one of the components performing the data transformation operation may be included in the channel or physical path between the host and data storage system. Additionally, following examples assume that the same single component performs complementary data transformation operations (e.g., same component performs both compression and decompression, or same component performs both encryption and decryption). However, more generally, an embodiment in accordance with techniques herein may partition such complementary operations among two different components so that, for example, a first component may perform encryption and a second different component may be perform decryption; or one component performs compression and another different component performs decompression.

Figure 3:
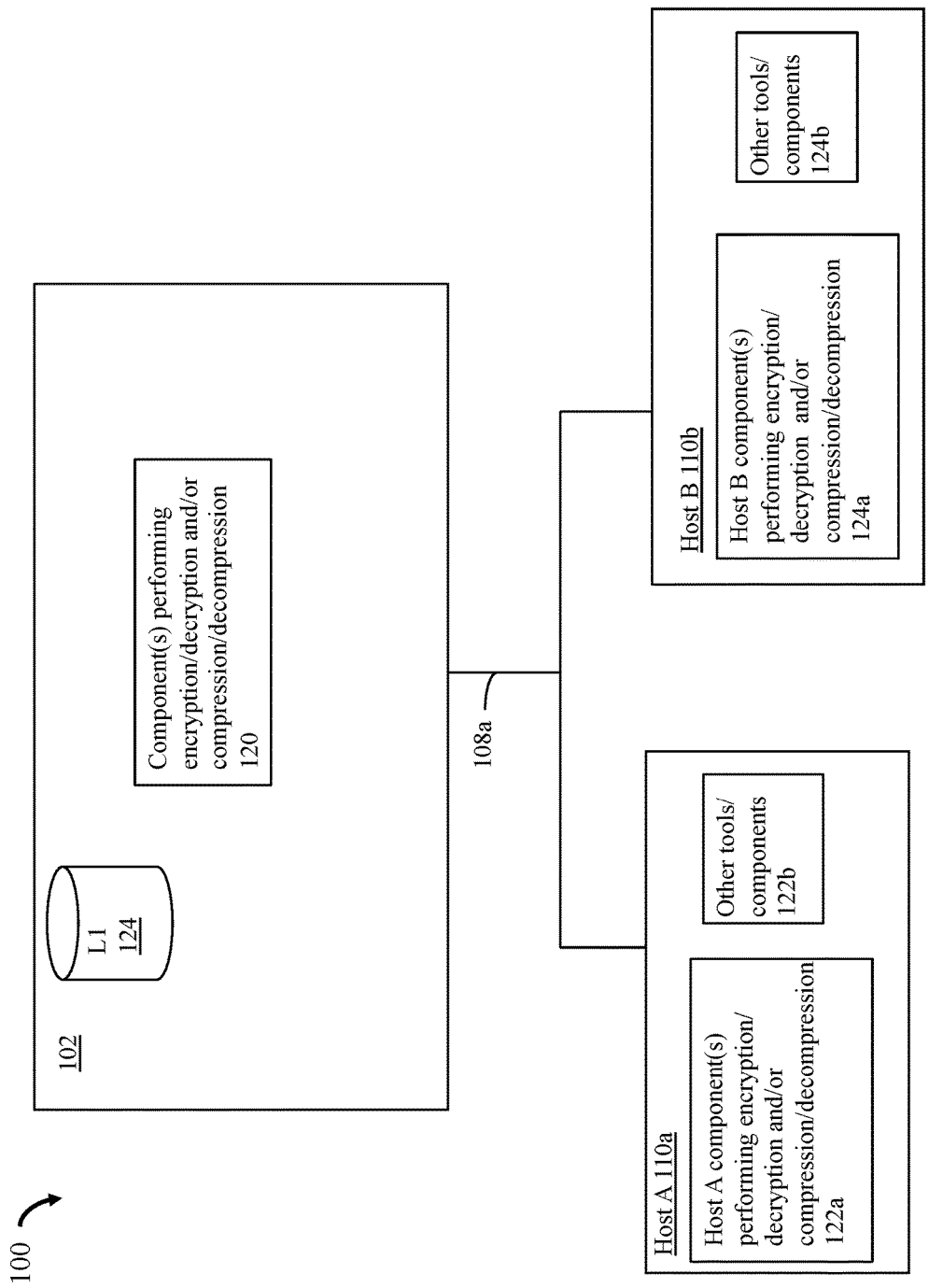

Referring to FIG. 3, shown is an example of an embodiment of a system 100 that may be used in connection with the techniques described herein. It should be noted that the embodiment illustrated in FIG. 3 presents a simplified view of some of the components illustrated in FIGS. 1 and 2A, for example, including only some detail of the data storage systems 20a through 20n for the sake of illustration.

Included in the system 100 are data storage system 102 and hosts 110a, 110b. Hosts 110a, 110b may perform operations to data storage system 102 over connection 108a. The hosts 110a, 110b may be connected to the data storage system 102 through connection 108a which may be, for example, a network or other type of communication connection. The data storage system 102 may include one or more logical devices. In this example, data storage system 102 includes logical device L1 124 and may also include one or more components that perform encryption/decryption and/or compression/decompression 120. Host 110a may include one or more components that perform encryption/decryption and/or compression/decompression 122a, and other tools/components 122b. Host 110b may include one or more components that perform encryption/decryption and/or compression/decompression 124a, and other tools/components 124b. Generally, elements 122b and 124b each denote other host-side tools and components that may be used in an embodiment in accordance with techniques. Examples of such additional host-side tools and components denoted by 122b, 124b are described in more detail, for example, in connection with FIG. 4B.

In at least one embodiment, one or more of the hosts 110a-110b may access logical device L1 124 over connection 108a. The logical device L1 124 may have a data layout based on the CKD (count key data) architecture and format, and one or more of the hosts 110a-c may access data of device L1 124 using a FICON connection. IBM's FICON (Fiber Connection) is a Fibre Channel protocol that provides high-speed connectivity between a channel and a control device and allows multiple data exchanges in full duplex mode. FICON may be used with Fibre Channel communication. FICON is compatible with z/Architecture computing systems in connection with I/O devices performing I/O processing therewith.

Element 102 may be a Symmetrix® data storage system, provided by EMC Corporation of Hopkinton, Mass., which is a data storage system compatible with FICON. For further discussion of FICON in connection with IBM System/390, a precursor to IBM System/z, see DeCusatis, et al., "Fiber optic interconnects for the IBM S/390 Parallel Enterprise Server G5," IBM J. Res. Develop., Vol. 43, No. 5/6, September/November 1999, pp. 807-828, which is incorporated herein by reference.

CKD may be characterized as a data storage device architecture where each storage device record includes of a count field, an optional key field, and a ("user") data field with error correction/detection information appended to each field. The sizes of the records within a single device may vary with the CKD architecture. Since data record lengths can vary, they all have an associated count field which indicates the size of the key if used and the size of the data. The count field has the identification of the physical location in cylinder-head-record format, the length of the key, and the length of the data. The key may be omitted or consist of a string of characters. Most often the key is omitted, the record located sequentially or by direct cylinder-head-record addressing. If it is present, the key is typically a copy of the first n bytes of the data record but can be any data which will be used to find the record. The key (and hence the record) is locatable via hardware commands.

As known in the art and mentioned above, I/O requests directed to devices in accordance with the CKD format may be in the form of channel programs (also known as channel word programs or chains) including an ordered sequence of channel command words (CCWs); or transport mode (TCW) and the associated device command words (DCWs). Additionally, channel word programs, processing I/O requests, and the like, are described also, for example, in U.S. Pat. No. 6,954,835, INTERCEPTING CONTROL OF A HOST I/O PROCESS, issued Oct. 11, 2005 (the '835 patent); U.S. Pat. No. 6,986,009, INTERCEPTING CONTROL OF A HOST I/O PROCESS, issued Jan. 10, 2006 (the '009 patent); and U.S. Pat. No. 7,707,186, issued Apr. 27, 2010, METHOD AND APPARATUS FOR DATA SET MIGRATION (the '186 patent), all of which are incorporated by reference herein.

The hosts 110a-b may each have an architecture based on IBM Corporation's System z architecture and computing environment. System z components, such as the hosts 110a-b, may operate with IBM's z/OS (operating system) and/or other zSeries operating systems. Input/Output (I/O) devices may be coupled to interact with mainframe computers, such as IBM's System z computing environment, that may include an I/O subsystem that communicates with the I/O devices over communication channels. The I/O subsystem controls data flow between I/O devices and main storage. The I/O subsystem may be coupled to the central processors of the main system and may communicate directly with the I/O devices. I/O subsystem may communicate with the I/O devices using multiple types of interfaces, including, for example, communication channels such as Fibre channels.

For further discussion of z/OS and z/Architecture components, see, for example, Loveland, et al., "Testing z/OS: The premier operating system for IBM's zSeries server," IBM Systems Journal, Vol. 41, No. 1, 2002, pp. 55-73, and Plambeck, et al., "Development and attributes of z/Architecture," IBM J. Res. & Dev., Vol. 46, No. 4/5, July/September 2002, pp. 367-379, which are incorporated herein by reference. See also, *z/Architecture: Principles of Operation*, IBM, SA22-7832-04, 2005 for a detailed z/Architecture description. In at least one embodiment, the hosts 110*a-b* may each be an IBM z series mainframe computing system running a version of the z/OS operating system. In such an embodiment, the hosts 110*a-b* may use a FICON connection to access data of logical devices. For example, the host 110*a* may issue a command, such as to read data from and/or write data to logical device L1 of data storage system 102.

In at least one embodiment in accordance with techniques herein, processing may be performed to indicate per I/O operation whether the data of that single I/O operation does, or does not need to be compressed and/or encrypted, and further select a particular component to perform any desired compression/decompression, and select a particular component to perform any desired encryption/decryption. In at least one embodiment, techniques may be performed by a host performing I/O operation directed to logical device L1 124 where such techniques provide for selectively indicating whether data of the I/O operation is encrypted and/or compressed and additionally may identify a particular component to perform the encryption and/or compression. Data that is encrypted and/or compressed may be stored on non-volatile physical storage of the data storage system in such encrypted/compressed form. Additionally, depending on what component performs the encryption/decryption and/or compression/decompression may affect whether the data read and/or written by the I/O operation is in its encrypted/compressed form when transmitted between the host and data storage system. As described below, an embodiment may even provide for selecting a component to perform encryption/decryption and/or compression/decompression for a data set, portions of a file or at the sub-file level, such as per track or record or other unit of storage/granularity that may denote a portion of a file.

The foregoing and other aspects of techniques herein for are described in more detail in following paragraphs whereby generally, selecting one or more components to perform encryption/decryption and/or compression for one or more particular portions of a logical device may be performed in accordance with one or more criteria.

Figure 4:
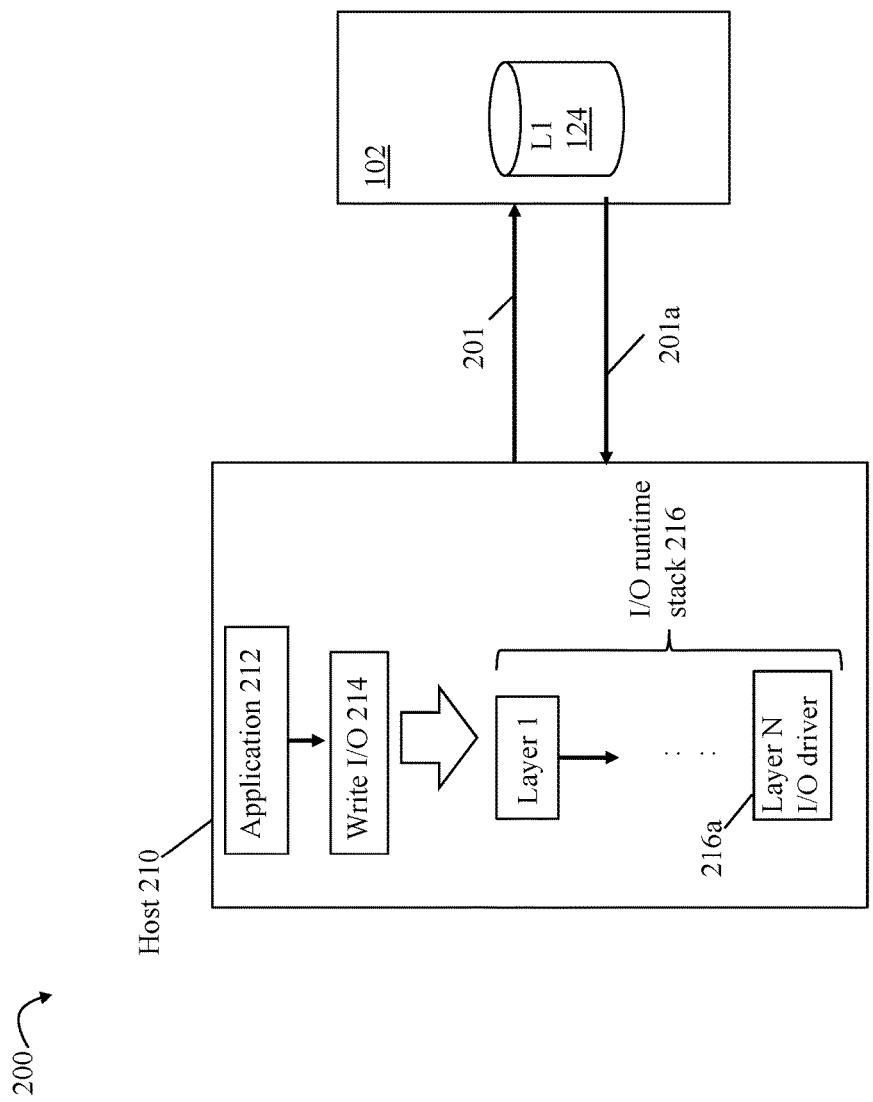

Referring to FIG. 4, shown is an example illustrating components and processing that may be performed in an embodiment in accordance with techniques herein. The example 200 includes host 210 and the data storage system 102. The example 200 provides additional detail in connection with only the single data storage system 102 and single host 210 for purposes of simplicity of illustration. However, more generally, such detail described herein with respect to a single data storage system and single host more generally applies to any one or more data storage systems and any one or more hosts. Element 102 may be as described in connection with FIG. 3 including the L1 logical device 124. The host 210 may be a host similar to the hosts 110*a-b* and others as described herein. Additionally, the host 210 may include application 212 executing thereon which may issue an I/O operation, such as a write I/O operation 214 that results in modification of data stored at a target location or offset on a logical device such as logical device L1 124.

Although in the example 200 of FIG. 4 the I/O operation 214 is a write operation, more generally, the data flow of the I/O path and techniques described herein are applicable for any I/O operation including a read operation with the difference that data is read rather than written with respect to the target location of the logical device.

The write I/O operation 214 may generally denote an I/O operation, read or write, performed with respect to any data stored on the logical device at the target location on a logical device. The I/O operation 214 may be a direct to a target address including user data, as well as other types of non-user data stored on the logical device. Such other types data of the logical device may also include, for example, metadata of the logical device.

Metadata of a logical device may include structural information about a data layout of the logical device. For example, the metadata may indicate information such as particular offsets or locations on the logical device where a file system is stored, where each file is stored, where extents or portions of each file are stored, and the like. As a file may increase in size, for example, additional extents may be added to the file whereby such extents of the file may be located at noncontiguous logical offsets or logical addresses of the logical device. In a similar manner, as the file stored on the logical device decreases in size (e.g., such as portions of the file are deleted), the file's metadata stored on the logical device may also change to denote the removed extents. Thus, metadata may be stored at various logical addresses or locations of the logical device where such stored metadata is modified as a result of different operations performed by the application.

The write I/O 214 may result in execution of a sequence of runtime calls or invocations of the I/O path on the host as denoted by the I/O runtime stack 216. Generally, the I/O runtime stack 216 may be characterized as a sequence of layered calls performed to process the write operation 214. Layer 1 may denote the highest layer of the stack 216 and layer N may denote the bottom or lowest layer in the stack 216. As known in the art, the stack 216 may include, for example, a logical volume manager, one or more I/O drivers, and the like. For example, if the write 214 writes user data to a location in a user data file, the stack 216 may include one or more layers that map the particular file location of the user data file to a host side logical device and associated logical device location. Additionally, the stack 216 may include an I/O driver 216*a* which may be characterized as a low level I/O driver that, for example, forms I/O command blocks sent to the system 102 and also receives responses from the system 102 in accordance with the particular protocols supported in an embodiment.

In at least one embodiment in accordance with techniques herein, the I/O driver 216*a* may perform processing as described herein for I/Os (e.g., read and/or write operations) directed to the L1 logical device 124. Each of the I/Os may be directed to a target location of logical device L1 124. The I/O driver 216*a* may perform processing to include information in the command request for each I/O operation where the information identifies the particular component on the host or data storage system selected to perform encryption/decryption and also the particular component on the host or data storage system selected to perform compression/decompression. In at least one embodiment, the I/O driver may obtain such information from one or more mapping tables identifying, for different logical devices and locations thereof, what component is selected to perform encryption/decryption and also the particular component on the host or data storage system selected to perform compression/decompression. For a single I/O, the I/O driver may include hint information in the I/O command request identifying the component(s) selected to perform encryption and compression of the data of the single I/O.

Figure 5:
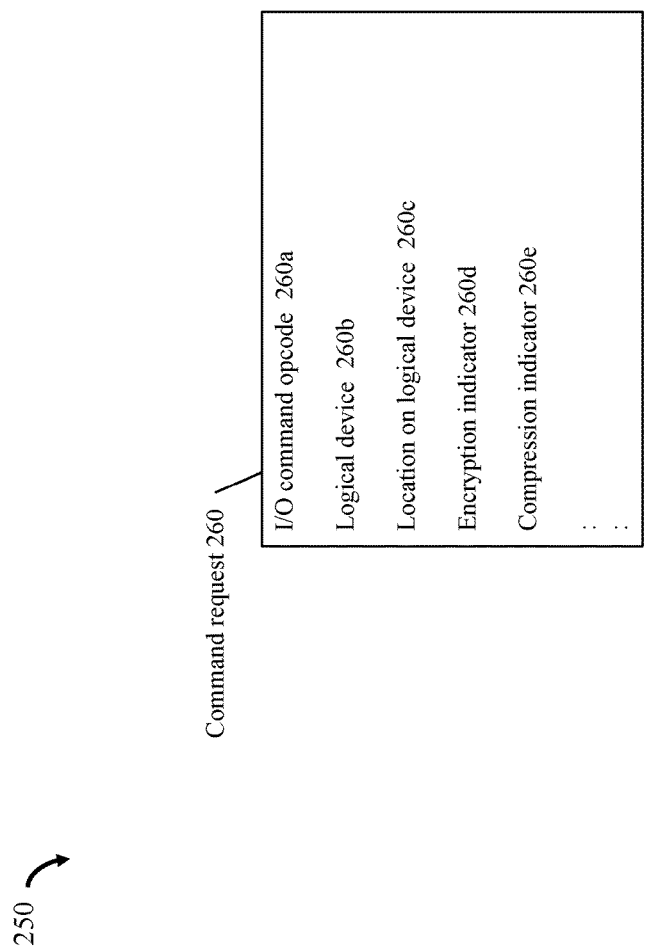
FIG. 5 is an example illustrating a command request that may be used in an embodiment in accordance with techniques herein.

Referring to FIG. 5, shown is an example 250 illustrating information that may be included in a command request in an embodiment in accordance with techniques herein. The command request 260 may be a request to perform an I/O operation such as may be sent 201 from the host 210 of FIG. 4 to the data storage system 102. The command request 260 may include information such as the I/O command opcode 260a indicating whether the I/O is a read or write operation, the particular logical address (e.g., the logical device 260b and location or logical offset(s) 260c on the logical device) to which this I/O is directed, encryption indicator 260d identifying a particular component to perform encryption/decryption of I/O data, compression indicator 260e identifying a particular component to perform compression/decompression of I/O data, and the like. The different pieces of information in 260 may be included in various fields of the command request as may vary with the particular layout of the structure for 260 used in an embodiment. For example, in at least one embodiment, the indicators 260d-e may be included in a header or control portion of the command request. In at least one embodiment, indicator 260d may identifying a particular one of a defined set of one or more components (e.g., actors or facilities) having the capability or functionality to perform encryption/decryption whereby the selected one of the defined set has been selected in accordance with techniques herein to perform the encryption/decryption. In a similar manner, indicator 260e may identifying a particular one of a defined set of one or more components (e.g., actors or facilities) having the capability or functionality to perform compression/decompression whereby the selected one of the defined set has been selected in accordance with techniques herein to perform the compression/decompression.

In at least one embodiment, each component of the defined set of one or more components used for 260d, 260e may be associated with a unique identifier or value included in a defined set of values. For example, a first defined set of values may be 0, 1, 2, where each of the foregoing values of the first defined set is an identifier (ID) associated with a different one of 3 components (included collectively in the host and data storage system) having the capability of performing encryption/decryption, and where 260d may identify the particular one of the 3 components (of the host and data storage system) selected to perform encryption/decryption for the I/O operation data. A second defined set of values may be 0 and 1 where each of the foregoing values of the second defined set is an ID associated with a different one of 2 components (of the host and data storage system) having the capability of performing compression/decompression, and where 260e may identify the particular one of the 2 components selected to perform compression/decompression for the I/O operation data. Each component is aware of its associated one or more identifiers (IDs). It should be noted that, as illustrated above, two different defined sets may be specified having different components since the capabilities and functionalities of each component may vary. A particular component may be able to perform: only compression/decompression but not encryption/decryption, only encryption/decryption but not compression/decompression, or both compression/decompression and also encryption/decryption. Thus, the sets of components capable of performing encryption/decryption and compression/decompression may vary in an embodiment in accordance with techniques herein. As a variation, in at least one embodiment, a single defined set of values may be used for both compression/decompression and also encryption/decryption where if a particular one of the components having an associated value of the single defined set is not capable of performing a desired operation (e.g., encryption/decryption or compression/decompression), processing herein may simply not specify in 260d-e the associated value of the single defined set for that particular component. For example, in at least one embodiment the single defined set of values may include 3 values—0, 1, and 2—denoting, respectively, a host-based component, a channel or path-based component, and a data storage system component. Each of the foregoing components may be implemented using hardware and/or software. For example, the host-based component may be a separate processor used to perform encryption/decryption and also compression/decompression. The channel or path-based component may be a card on the host that performs encryption/decryption but not compression/decompression. The data storage system may include hardware and/or software components that perform encryption/decryption and also compression/decompression.

In connection with FIG. 5 and consistent with discussion elsewhere herein, the command request 260 includes 2 indicators 260d-e as may be used in an embodiment where the same component identified by 260d performs both encryption and decryption, and the same component identified by 260e performs both compression and decompression. An embodiment may more generally partition the data transformation operations of encryption and decryption among two different components and may similarly partition the data transformation operations of compression and decompression among two different components. In such an embodiment, the command request 260 may include 4 indicators corresponding, respectively, to 4 selected components to perform the 4 data transformation operations of encryption, decryption, compression and decompression. In this manner, an embodiment may generally include a single indicator in the command request 260 for each data transformation operation that may be performed by possibly a different component.

Figure 6:
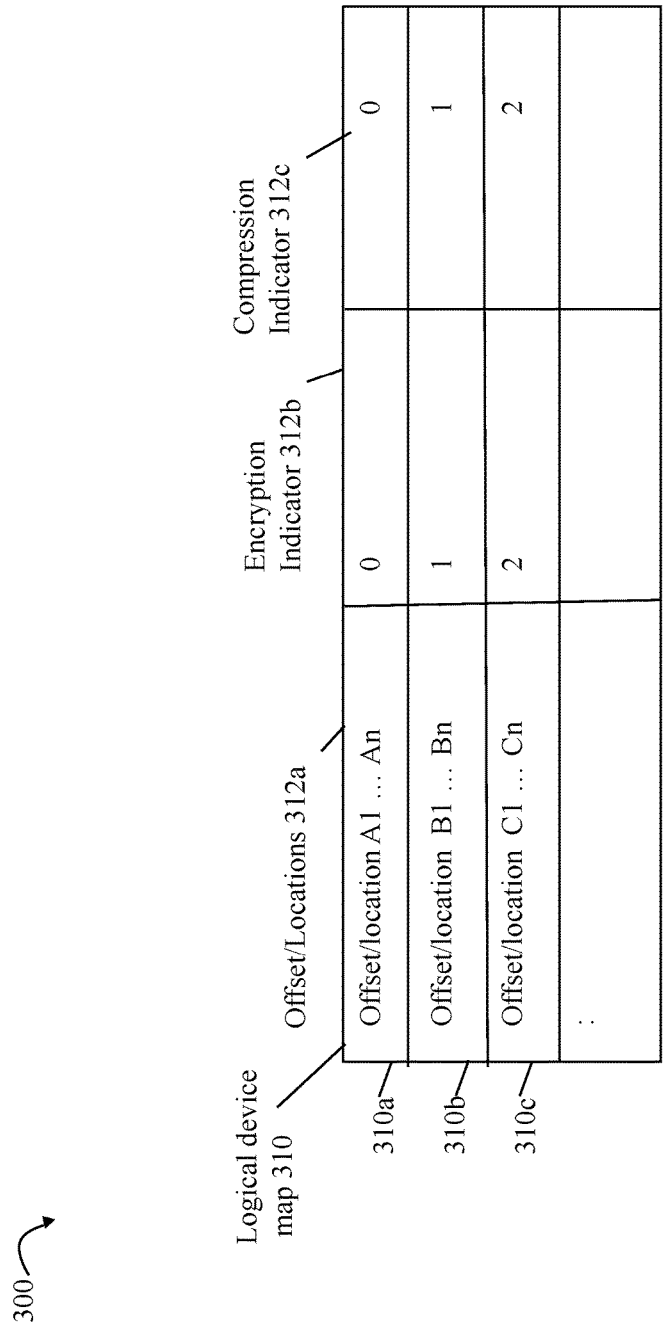
FIG. 6 is an example of a logical device map, or mapping information, that may be used in an embodiment in accordance with techniques herein.

Referring to FIG. 6, shown is an example 300 of mapping information that may be used by the host I/O driver 216a in an embodiment in accordance with techniques herein. The example 300 illustrates a logical device map 310 that indicates for different offsets or locations 312a of the logical device whether replication is enabled or disabled 312b for each specified sequence of offsets or locations. Additionally, an embodiment may denote in the map 310 the type of data 312c stored at particular logical device locations or offsets. A different logical device map 310 may be maintained on the host for each logical device stored on the data storage system 102. Each row of 310 denotes a sequence of one or more contiguous logical device offsets or locations (in column 312a) and identifies (in columns 312b and 312c) for the sequence the particular component(s) that performs encryption/decryption and compression/decompression. For example, row 310a indicates that, for offset or locations A1 through An of the logical device, the component identified by the value 0 (column 312b) is selected to perform encryption/decryption and the component identified by the value 0 (column 312c) is selected to perform compression/decompression; row 310b indicates that, for offset or locations B1 through Bn of the logical device, the component identified by the value 1 (column 312b) is selected to perform encryption/decryption and the component identified by the value 1

(column 312c) is selected to perform compression/decompression; and row 310c indicates that, for offset or locations C1 through Cn of the logical device, the component identified by the value 2 (column 312b) is selected to perform encryption/decryption and the component identified by the value 2 (column 312c) is selected to perform compression/decompression.

Different offsets or locations of the logical device map 310 may correspond to different types of user data and non-user data. For example, logical device metadata (an example of non-user data) may be located at a first set of offsets or locations on a logical device as denoted by the map 310. Additionally, different types of user data from different data sets, files, extents or portions of a file, and the like, may be located at a second different set of locations and offsets denoted by the map 310.

In connection with FIG. 6 and consistent with discussion elsewhere herein, the logical device map 310 includes 2 columns 312b-c for two different indicators as may be used in an embodiment where the same component identified by 312b performs both encryption and decryption, and the same component identified by 312c performs both compression and decompression. An embodiment may more generally partition the data transformation operations of encryption and decryption among two different components and may similarly partition the data transformation operations of compression and decompression among two different components. In such an embodiment, the logical device map 310 may include 4 columns of indicators corresponding, respectively, to 4 selected components to perform the 4 data transformation operations of encryption, decryption, compression and decompression. In this manner, an embodiment may generally include a single indicator for each data transformation operation that may be performed by possibly a different component.

Generally, the mapping information, such as illustrated in table 310 denoting the logical device map of FIG. 6, may be characterized as compression/encryption hint information generated and updated automatically by a component selection tool that will now be described in connection with FIG. 6B.

Figure 6B:
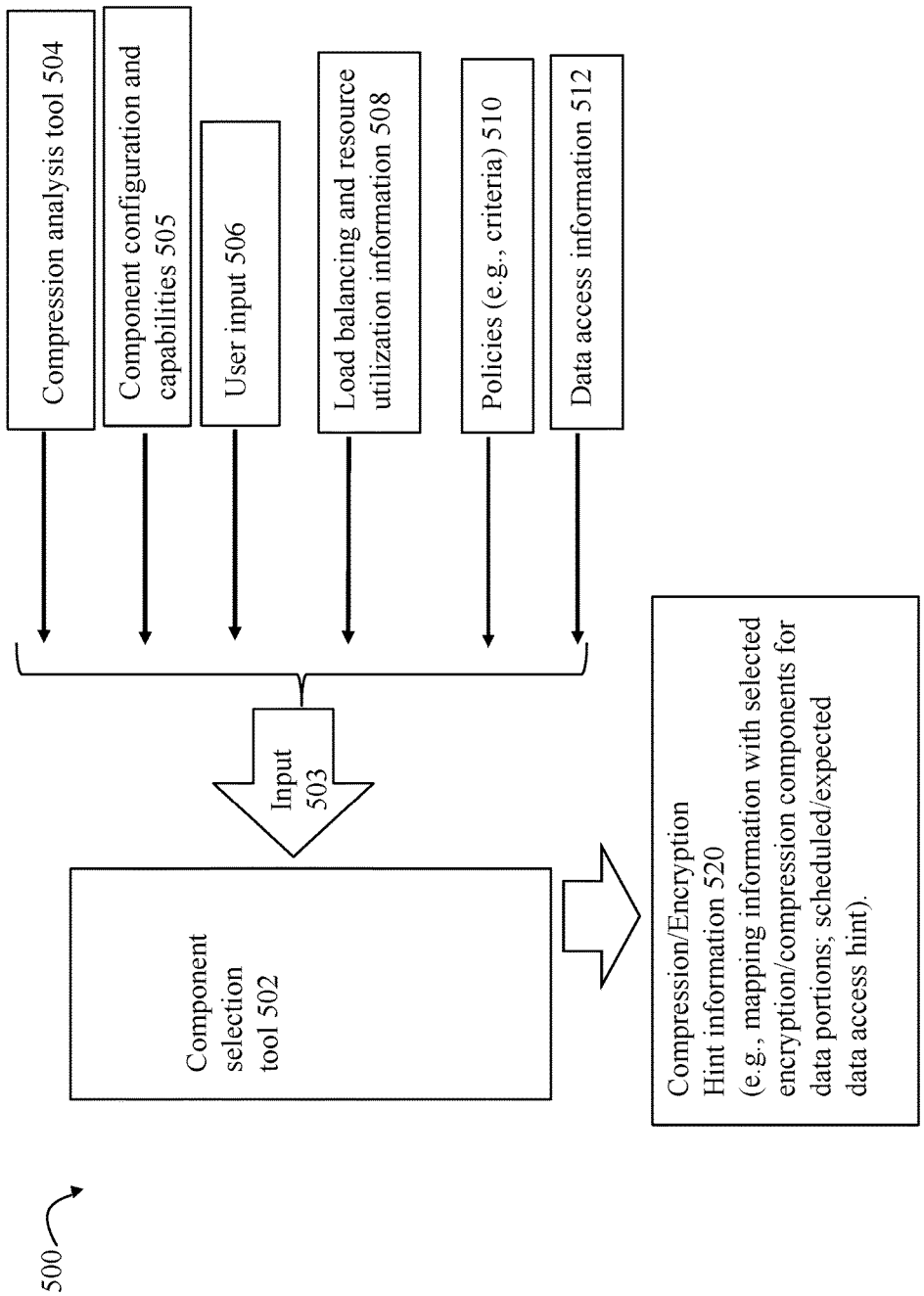

Referring to FIG. 6B, shown is a representation of components and tools that may be included on a host in an embodiment in accordance with techniques herein. The example 500 provides additional detail regarding other tools/components denoted by elements 122b and 124b in FIG. 3. The example 500 includes the component selection tool 502 that automatically selects particular components to perform encryption/decryption and compression/decompression for different target locations of I/O operations. The component selection tool 502 may receive one or more inputs 503. In at least one embodiment, the one or more inputs 503 may include any one or more of: outputs from compression analysis tool 504, component configuration and capabilities 505, user input 506, load balancing and resource utilization information 508, one or more policies 510 embodying one or more criteria used for component selection, and data access information 512. In at least one embodiment in accordance with techniques herein, the one or more inputs 503 may include at least the component configuration and capabilities 505. In at least one embodiment in accordance with techniques herein, the one or more inputs 503 may include at least the component configuration and capabilities 505, the policies 510 and the output from the compression analysis tool 504. An embodiment in accordance with techniques herein may include additional or different inputs in 503 than as described herein.

The data access information 512 may include hint information based on scheduled or planned future data access to different data portions (e.g., particular data sets, files, extents or file portions, portions of logical devices, and the like). The data access information 512 may include hint information based on specified schedules of expected or planned access dates/times for particular portions of data where the schedules may be explicitly defined, such as by a user. The data access information 512 may include hint information based on observed data access in connection with analysis of observed I/O operations (e.g., issued by applications on the host where such I/Os may be received by the I/O driver on the I/O path). For example, the I/O driver or other component may record/track which particular logical device portions (e.g., data set, file, or other storage entity) are accessed at different points in time. Based on prior observed historical information recorded, the data access information 512 may be determined and used as a prediction of when the data portions are expected to be accessed. For example, if a first data portion stored at a first logical address range of a first logical device has been accessed the last week of each month based on prior observation over a time period, the data access information 512 may include a hint identifying the last week of each month as the expected or predicted data access time for the first data portion at the first logical address range on the first logical device. In at least one embodiment, the additional data access information 512 may be included in the I/O request as additional hint information per I/O. For example, when there is a first I/O operation directed to write data to the first data portion at the first logical address range of the first logical device, the first I/O operation may include a hint identifying the last week of each month as the expected or predicted data access time for the first data portion at the first logical address range on the first logical device. In this manner, if a component of the data storage system is selected to perform encryption and/or compression for the first data portion, the data storage system may have knowledge conveyed by the hint of the I/O operation so that the data storage system component(s) may commence performing any needed decryption and/or decompression prior to actually receiving a subsequent I/O operation directed to the same first data portion/same first logical address range of the first logical device.

Generally, tool 502 outputs compression/encryption hint information 520. Element 520 may also be referred to as data transformation hint information and may include the mapping information such as illustrated in table 310 denoting the logical device map of FIG. 6. Additionally, element 520 may also include additional hint information such as the hint information described above in connection with element 512 identifying when particular target locations are expected or scheduled to be accessed. Such additional hint information reflecting expected or scheduled data access information 512 may be provided by the host to the data storage system in any suitable manner (e.g., as hint information in an I/O operation; through event reporting (e.g., unsolicited interrupt) initiated by the host or responding to a polling request for information from the data storage system; and the like). In at least one embodiment, the component selection tool 502 may initially execute and generate a first set of compression/encryption hint information 520. Subsequently, the tool 502 may execute as a background task that periodically receives any updated input(s) 503 and accordingly periodically updates the information of 520.

The compression analysis tool 504 is generally mentioned above. The tool 504 may output, for example, a metric, such as the compressibility factor described above, denoting the amount of data compression obtained for each of the different host-based and data storage system-based components that perform compression/decompression for different data portions or data sets. In at least one embodiment, the compression analysis tool 504 may be executed for different customer data sets or portions thereof to obtain the different compressibility factors for the different components of the host and/or data storage system that may perform compression/decompression. It should be noted that an embodiment may decide, such as by the tool 502 or 504, not to perform any compression, for example, if there is no component capable of obtaining at least a minimum amount of compression (e.g., at least 5%) for a particular data portion. Additionally, since encryption is performed after compression, the particular compression technique and component selected by the tool 502 or 504 to perform compression may be affected by the position on the I/O path of the component selected to perform encryption.

The component configuration and capabilities 505 may identify the different components of the host and data storage system that perform compression/decompression and/or encryption/decryption. Generally, element 505 may be characterized as the configuration of the different host and data storage system components capable of performing compression/decompression and encryption/decryption.

An embodiment may also provide a customer or user with the ability/capability to selectively indicate whether encryption/decryption and compression/decompression are performed for particular portions of a logical device, and also to select the particular component(s) to perform encryption/decryption and compression/decompression. In at least one embodiment, the interface may provide the customer with the option to perform the foregoing with respect to user data portions of a logical device where such user input 506 may be provided as one of the inputs 503 to the component selection tool 502.

It should be noted that generally, whether to perform encryption/decryption and/or compression/decompression as well as the particular component(s) to perform the foregoing may be determined in accordance with one or more criteria such as may be embodied in one or more policies 510. In connection with encryption/decryption, one or more criteria may be specified for different portions of the logical device and include, for example, whether a particular portion of the logical device contains certain types of data such as personal information or financial information which may be required to be encrypted; whether a particular portion of a logical device is being transmitted over a path, channel, or connection of a trusted (e.g., secure) or untrusted (e.g., insecure) network (e.g., if network is untrusted end to end encryption may be required so that the encryption is required to performed at the host); and selecting one of multiple components capable of performing encryption/decryption based on load balancing and resource utilization (e.g., if the host is overloaded such as based on CPU utilization but not the data storage system, a data storage system component may be selected to perform encryption/decryption rather than a component on the host; selecting one of multiple components capable of performing encryption/decryption based on user selection/input.

In connection with compression/decompression, one or more criteria may be specified for different portions of the logical device and include, for example, whether a particular portion of a logical device contains data that achieves at least a minimum amount of compressibility (e.g., if no compression technique available provides at least the minimum amount of compression for data then no compression may be used on the data); for a particular data portion, which one of multiple components capable of performing compression/decompression provides, or is expected to provide such as through testing, the best compression of all the multiple components; selecting one of multiple components capable of performing compression/decompression based on load balancing and resource utilization (e.g., if the host is overloaded such as based on CPU utilization but not the data storage system, a data storage system component may be selected to perform compression/decompression rather than a component on the host; if the current network bandwidth between the host and data storage system is saturated/at a maximum threshold level, then the compression may be done on the host rather than the data storage system to reduce the amount of data transmitted over the network from the host to the data storage system); selecting one of multiple components capable of performing compression/decompression based on user selection/input.

Different combinations of the criteria may be included in one or more defined policies used in an embodiment in accordance with techniques herein where such policies 510 may be one of the inputs 503 provided to the component selection tool 502. For example, a policy of 510 may be defined that specifies to perform end-to-end encryption (thus requiring host-based encryption/decryption) for any data stored on any logical device where the data is characterized as requiring an associated level of security due to the sensitive nature of the stored data. For example, particular data files stored on logical devices may include personal information of different people such as medical information, financial information, passwords, social security number, credit card numbers, and the like. Such personal information may be considered sensitive or require a heightened level of security. As such, the policy may indicate what files or data portions include such sensitive or secure data that should only be transmitted over a trusted or secure network, require end-to-end (thus host side) encryption/decryption, and the like.

Load balancing and resource utilization information 508 may be provided as one of the inputs 503. Such information of 508 may generally include one or more metrics characterizing current load or resource utilization of the host, data storage system, and/or network or other connection (e.g., between the host and data storage system over which I/Os and I/O data are sent). For example, information 508 may include CPU or processor utilization of the host and/or data storage system, current data throughput or rate of data transfer over the network or other connection between the host and data storage system, current I/O response time for I/Os issued from the host to the data storage system, amount/percentage of cache utilized on the data storage system for I/O data, and the like. In at least one embodiment, information of 508 regarding the data storage system may be reported by the data storage system to the host or otherwise estimated. The tool 502 may use the information 508 in connection with performing load balancing among the host and data storage system when selecting particular components to perform data transformation operations for particular data portions. For example, if the host is overloaded (based on information of 508 reported), but the network and data storage system are not (e.g., have low/lower load based on information of 508), component(s) of the data storage system may be selected to perform compression and encryption rather than a host-based component.

The I/O driver may receive an I/O operation from the host application where the write operation is directed to the logical device L1 on system 102 and use information in the logical device's map 310, or more generally in accordance with the one or more criteria, to determine whether to perform encryption/decryption and/or compression/decompression and also select the particular component(s) to perform the foregoing if desired.

In at least one embodiment, indicators 260d and 260e may be specified in the I/O operation command or request affecting the entire I/O operation as described above. However, the host application may issue an I/O operation to a target location on the logical device where the target location denotes a logical address portion including a first logical address portion and also a second logical address portion. The logical device mapping information such as illustrated in FIG. 6 may identify a first component to be used for encryption for the first logical address portion and a second different component to be used for encryption for the second logical address portion. More generally, the target location of an I/O operation may denote a logical address range that includes multiple logical address range portions where different components are indicated to be used for different ones of the portions for encryption (and similarly for compression). In such instances, the I/O driver may take one of possibly multiple actions depending on the embodiment. For example, the I/O driver may select one of the indicated different components specified for the different portions. For example with reference to FIG. 6, a single host write operation may write data to a target logical address range on the logical device where the target logical address range spans 310a and 310b. Assume the single host write operation writes data to the target logical address range A1-Bn. In this case, the I/O driver may look up in the map 310 and determine that the single host write spans a target that includes locations for which two different components are selected for encryption in column 312b where the I/O driver selects either the component associated with 0 or 1. It should be noted that since generally data may be compressed prior to encryption, a data storage system component may not be selected for compression while also selecting another host-based component to perform encryption prior to compression. Thus, there is an order or positional dependence on the I/O path between components selected to perform encryption/decryption and compression/decompression.

As another option/action, the I/O driver may receive the single host write operation and further partition the single host write operation into multiple write operations where each of the multiple write operations may write data to a different logical address portion, and each of the multiple write operations may individually have a different indicator value denoting the component selected to perform encryption for a single one of the multiple write operations created from the single host write operation. For example with reference to FIG. 6, a single host write operation may write data to a target logical address range on the logical device where the target logical address range spans 310a and 310b. Assume the single host write operation writes data to the target logical address range A1-Bn. In this case, the I/O driver may look up in the map 310 and determine that the single host write spans a target that includes locations for which multiple different components are indicated as performing encryption (e.g., in column 312b values of 0 and 1 of rows 310a-b) and multiple different components are indicated for compression (e.g., in column 312c values of 0 and 1 in rows 310a-b). The I/O driver may partition the single host I/O write into two smaller write operations including a first write operation that writes data to locations A1 through An and a second write operation that write data to locations B1 through Bn. The first write operation may indicate that encryption is performed by component 0 and compression is performed by component 0, and the second write operation may indicate that encryption is performed by component 1 and compression is performed by component 1. The I/O driver may perform the foregoing partitioning in a manner transparent to the issuing application and issue the multiple smaller write operations to the data storage system 102 rather than a single write operation. In such an embodiment, the I/O driver may perform additional processing to track the status of each of the smaller write operations since each such write operation may be completed and performed in any order. More generally, the I/O driver may partition a single originating host I/O operation, read or write, into any suitable number of smaller I/O operations (e.g., each to a different logical address range) whereby collectively the smaller I/O operations specify a collective or aggregate set of target logical addresses equivalent to that of the single originating host I/O operation.

Figure 7:
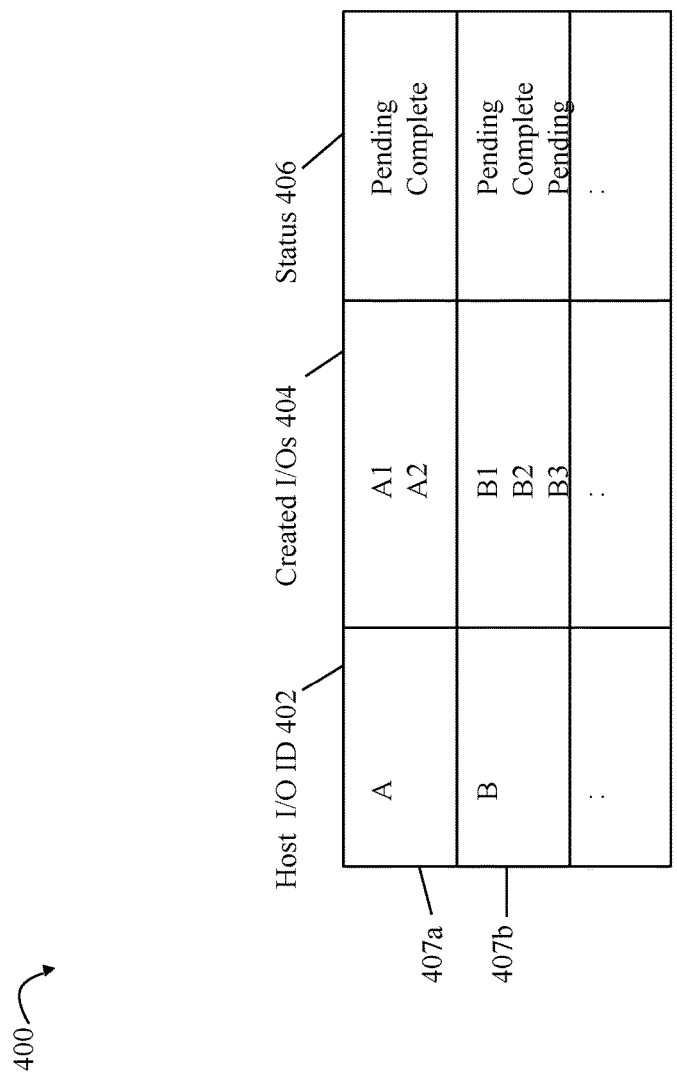
FIG. 7 is an example of information that may be used by an I/O driver in an embodiment in accordance with techniques herein.

Referring to FIG. 7, shown is an example of information that may be used by an I/O driver of the host in an embodiment in accordance with techniques herein. The example 400 illustrates information that may be maintained and used by the I/O driver in connection with tracking the multiple I/O operations created as a result of a single originating host I/O operation such as issued by an application executing on the host. In at least one embodiment, each originating host I/O that is further partitioned into multiple smaller I/Os may be assigned a unique identifier (ID) used to track and uniquely identifier the originating host I/O. The table 400 may include a first column 402 denoting the originating host I/O ID, a second column 404 denoting the multiple smaller I/Os created from the single host I/O, and a third column 406 denoting the status of each of the smaller I/Os. The table may include a set of information or entry for each of the originating I/Os. For example, row 407a includes information for the single host I/O having ID=A for which the I/O driver created two smaller I/Os—A1 and A2. In this example as denoted by 407a in column 406, A1 is still pending while A2 has completed. Row 407b includes information for another single host I/O having ID=B for which the I/O driver created 3 smaller I/Os—B1, B2 and B3. In this example as denoted by 407a in column 406, writes B1 and B2 are pending while write B2 has completed.

A status of pending in column 406 may denote that particular smaller I/O operation has not yet completed in that the I/O driver on the host has not yet received an acknowledgement from the local or first data storage system 102 that the smaller I/O operation has completed. A status of completed in column 406 may denote that particular smaller I/O operation has completed in that the I/O driver on the host has received an acknowledgement from the data storage system 102 that the smaller I/O operation has completed. Once the I/O driver receives notice of completion of all smaller I/Os 404 created for a particular originating I/O denoted by 402, then the I/O driver may return an acknowledgement to the application or other requester that the originating I/O has completed. The I/O driver may also update the table 400 to remove information regarding an originating I/O once all created smaller I/Os for the originating I/O have completed.

Figure 8:
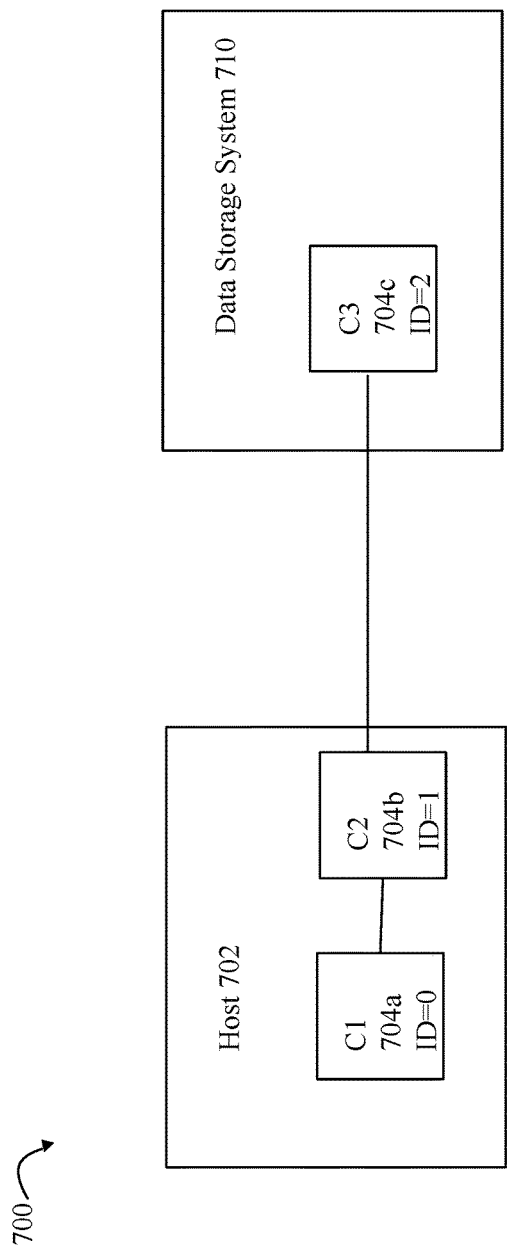

Referring to FIG. 8, shown is an example illustrating components of the host and data storage system that may be capable of performing encryption/decryption and/or compression/decompression in an embodiment in accordance with techniques herein. The example 700 includes host 702 and data storage system 710 which are systems as described elsewhere herein (with details omitted for illustration in connection with FIG. 8). In this example there are 3 components 704a-c, respectively, associated uniquely with a different one of the identifiers (IDs) {0, 1 and 2}. The example 700 includes 3 components—C1 704a having ID=0, C2 704b having ID=1, and C3 704c having ID=2—which are hardware and/or software components each capable of performing encryption/decryption and also compression/decompression. Components 704a-b are host-side components and component 704c is a data storage system side component. Components C1-C3 704a-c may occur in sequential left to right order on the I/O path for I/O issued from the host 702 to data storage system 710. As described herein, if both compression and encryption are performed, compression is performed prior to encryption. Thus, such ordering or dependency affects possible selection of components to perform encryption and decryption. Thus, for example, selection of C3 704c to perform compression/decompression means that 704c is also selected to perform encryption/decryption. As another example, selection of C2 704b to perform compression/decompression means that either 704b or 704c (but not 704a) may be selected to perform encryption/decryption. As another example, selection of C1 704a to perform compression/decompression means that any of 704a-c may be selected to perform encryption/decryption. As another example, selection of C2 704b to perform encryption/decryption means that either 704a or 704b (but not 704c) may be selected to perform compression/decompression. In this manner, if both compression/decompression and encryption/decryption are to be performed for a data portion, the tools/components of the host (e.g., such as the I/O driver and/or other host-based tools/components as illustrated in FIG. 6B) may consider possible components also taking into account the foregoing dependency.

In at least one embodiment, it may be determined, such as by the tool 502 and/or I/O driver, that a particular data portion is not to be encrypted and/or not to be compressed. The foregoing option of no encryption and similarly no compression may be indicated using any suitable technique. For example, with reference to FIG. 8, assume C1 704a with ID=0 only performs compression but not encryption, the tool 502 of the host may know the foregoing capability of 704a and may indicate no compression by actually setting the compression indicator 260e to have a value of 0 thus indicating component 704a is to perform compression. Generally, the tool 502 and/or I/O driver of the host may purposely set indicator 260d to identify one of the components that does not have the encryption/decryption capability to thereby avoid having any encryption/decryption performed at all for an I/O operation's data. In a similar manner, the tool 502 and/or I/O driver of the host may purposely set indicator 260e to identify one of the components that does not have the compression/decompression capability to thereby avoid having any compression/decompression performed at all for an I/O operation's data. As another technique, an embodiment may set indicator 260d to a particular value used to denote, that no encryption/decryption is performed for the particular I/O data; and may set indicator 260e to a particular value used to denote, that no compression/decompression is performed for the particular I/O data.

As described herein, in at least one embodiment, data may be stored on physical storage of the data storage system in its compressed and encrypted form. Consider further an embodiment where component(s) of the data storage system are used to perform compression and encryption of data (e.g., of a particular logical device or data set) and where the data is further replicated, such as using a remote data facility as discussed above, to another second data storage system. The second data storage system may be used in case the primary first data storage system and its data is unavailable. In such a case, in the event of a disaster at the first data storage system, the replicated or remote data copy on the second data storage system (remote or recovery site) may be used by a host. However, the second data storage system may not have any knowledge regarding the particular algorithms or techniques used by the first data storage system for encryption/decryption and compression/decompression. Generally, the recovery site/data storage system will need to have knowledge regarding the particular algorithms or techniques used by the first data storage system for compression/encryption in order to decompress/decrypt the data from its compressed/encrypted stored form. In order to facilitate the use of the data at the remote recovery site/second data storage system, the knowledge of the particular algorithms or techniques used by the first data storage system for encryption/decryption and compression/decompression may be provided to the host and/or second data storage system prior to the disaster at the first data storage system.

Figure 9:
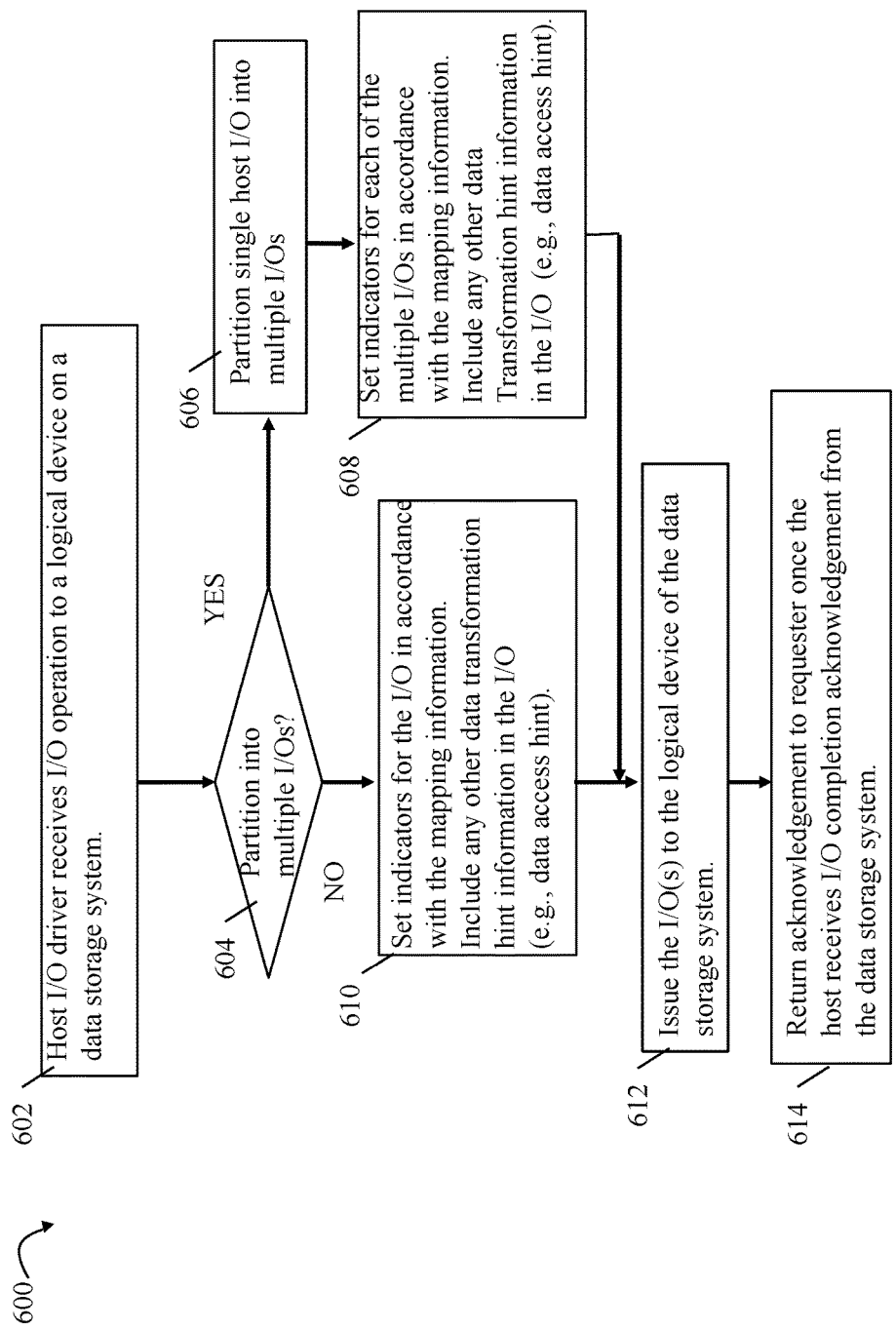
FIGS. 9 and 10 are flowcharts of processing steps that may be performed in an embodiment in accordance with techniques herein.
Figure 10:
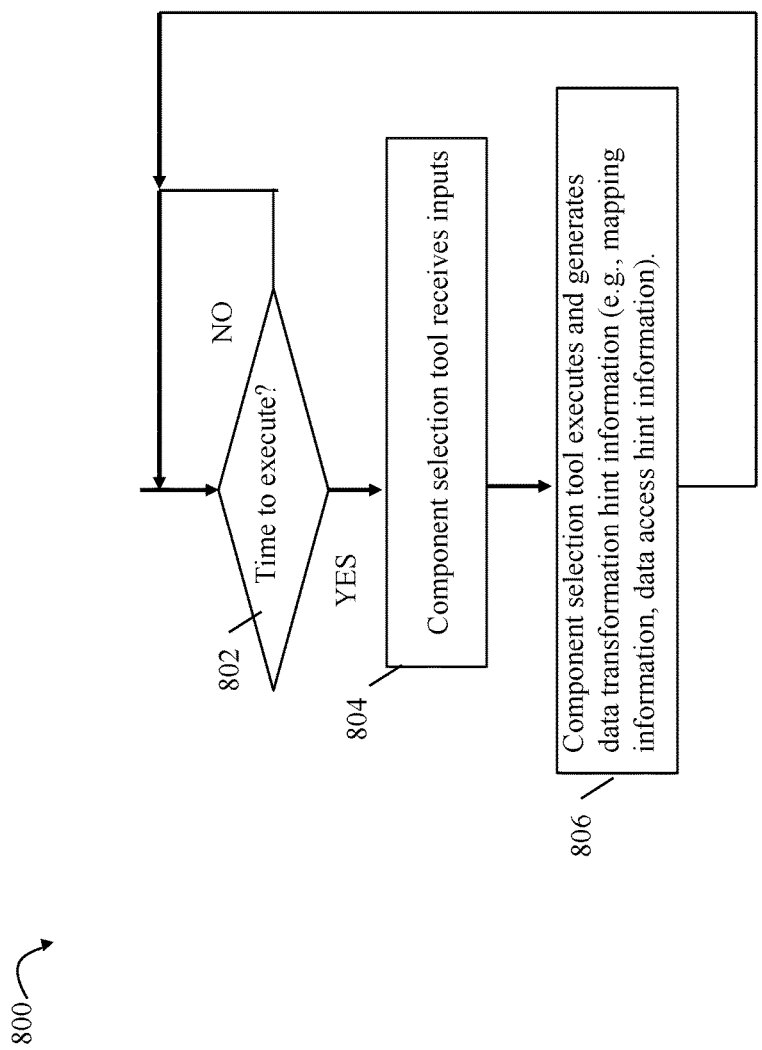

Referring to FIGS. 9 and 10, shown are flowcharts of processing that may be performed in embodiment in accordance with techniques herein. The flowcharts 600 and 800 generally summarize processing described above.

Referring to FIG. 9, shown is a first flowchart of processing that may be performed in embodiment in accordance with techniques herein. At step 602, the host I/O driver receives an I/O operation directed to a logical device on a data storage system. As described above, the I/O driver may be part of the I/O path or I/O stack executed at runtime for processing the I/O operations. At step 604, a determination may be made as to whether the single I/O operation should be partitioned into multiple smaller I/Os. If step 604 evaluates to yes, control proceeds to step 606 where the single I/O is partitioned into multiple I/Os. In step 608, for each of the multiple I/Os, the I/O driver creates a command request including the indicators denoting selected components for performing the data transformation operations (e.g., encryption/decryption and compression/decompression). The particular components selected may be in accordance with the mapping information (e.g., as included in the data transformation hint information 520 and also illustrated in FIG. 6). As discussed elsewhere herein, the mapping information identifies different components selected to perform data transformation operations for different data portions (e.g., different data sets or portions thereof, different files or portions thereof, different portions of different logical devices). Additionally, in step 608, other data transformation hint information (e.g., data access hint as discussed in connection with element 520) may be included in one or more of the command requests. From step 608 control proceeds to step 612. If step 604 evaluates to now, control proceeds to step 610. Step 610 processing is similar to as described in step 608 where the I/O driver creates a command request for the single I/O operation received in step 602. The command request includes the indicators denoting selected components for performing the data transformation operations (e.g., encryption/decryption and compression/decompression) and may also include other data transformation hint information (e.g., data access hint as discussed in connection with element 520). From step 610, control proceeds to step 612 where the I/O(s) directed to the logical device are issued from the host to the data storage system. At step 614, the host returns an acknowledgement (along with any requested I/O data) to the requester (e.g., originator of the I/O operation received in step 602) once the host receives I/O completion acknowledgement from the data storage system.

Referring to FIG. 10, shown is a second flowchart of processing that may be performed in embodiment in accordance with techniques herein. The flowchart 800 summarizes processing that may be performed in an embodiment using the component selection tool 502 such as described in connection with FIG. 6B. As described above, in at least one embodiment, the tool 502 may execute periodically (e.g., such as background process), or more generally, in response to an occurrence of one or more specified events. At step 802, a determination is made as to whether it is time for the component selection tool to execute. Step 802 may evaluate to yes responsive to an occurrence of a specified event, such as at a next occurrence of a periodic scheduled execution time. Otherwise, step 802 evaluates to no and remains at step 802. Responsive to step 802 evaluating to yes, control proceeds to step 804 where the component selection tool receives any updates with respect to the inputs 503 as illustrated in FIG. 6B. At step 806, the component selection tool executes and generates data transformation hint information (e.g., element 520 of FIG. 6B, which may include mapping information and data access hint information). From step 806, control proceeds to step 802 to wait for the next execution time for executing the component selection tool An embodiment may implement the techniques herein using code executed by a processor. For example, an embodiment may implement the techniques herein using code which is executed by a processor. As will be appreciated by those skilled in the art, the code may be stored on a computer-readable medium having any one of a variety of different forms including volatile and nonvolatile, removable and non-removable media implemented in any method or technology for storage of information such as computer readable instructions, data structures, program modules or other data. Computer-readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
receiving, on a host, a first I/O operation;
determining whether to partition the first I/O operation into a plurality of I/O operations, wherein each of the plurality of I/O operations performs an I/O operation to a different logical address in a target range denoted by the first I/O operation;
responsive to determining not to partition the first I/O operation, performing first processing including:
creating, on the host, a first request for the first I/O operation, the first request including a first indicator identifying a first component of a plurality of components selected to perform, on data of the first I/O operation, one or more data transformation operations including any of encryption, decryption, compression and decompression, wherein the plurality of components include at least one component on the host and at least one component on the data storage system; and
sending, from the host to the data storage system, the first request to perform the first I/O operation; and
responsive to determining to partition the first I/O operation, performing second processing comprising:
creating a plurality of requests for the plurality of I/O operations, wherein each of the plurality of I/O operations includes an indicator identifying one of the plurality of components selected to perform, on data of said each I/O operation, one or more data transformation operations including any of encryption, decryption, compression and decompression; and
sending, from the host to the data storage system, the plurality of I/O operations.

2. The method of claim 1, wherein the first component includes any of hardware and software used to perform the one or more data transformation operations.

3. The method of claim 1, wherein an I/O driver of the host creates the first request and sets the first indicator in the first request.

4. The method of claim 1, further comprising:
determining a first component set of one or more of the plurality of components, wherein each component of the first component set is capable of performing at least one of the one or more data transformation operations; and
selecting the first component from the first component set.

5. The method of claim 4, wherein the first component set includes less than all of the plurality of components.

6. The method of claim 4, wherein the first component is selected in accordance with one or more inputs including information identifying which of the plurality of components are capable of performing each of the one or more data transformation operations.

7. The method of claim 6, wherein the first I/O operation is directed to a target location and the one or more data transformation operations include compression, each component of the first component set is capable of performing compression and decompression, and the first component is selected to perform compression as indicated by the first indicator, and the one or more inputs include compression analysis information identifying, for the target location, a compressibility factor for each component of the first component set whereby said compressibility factor denotes an amount by which said each component compresses, or is expected to compress, first data stored at the target location.

8. The method of claim 6, wherein the one or more inputs include load balancing and resource utilization information of any of the host, the data storage system, and a network or connection between the host and data storage system over which the first I/O operation is transmitted.

9. The method of claim 6, wherein the one or more inputs include at least one policy comprising one or more criteria specifying when the one or more data transformation operations are to be performed.

10. The method of claim 6, wherein the one or more inputs include data access information identifying when particular data portions are expected to be accessed.

11. The method of claim 6, wherein the one or more inputs include user input indicating, for at least one data portion, a particular one of the plurality of components is to be used in connection with performing any of the one or more data transformation operations.

12. The method of claim 6, wherein the one or more inputs are provided to a component selection tool that produces data transformation hint information comprising mapping information, said mapping information identifying particular ones of the plurality of components selected to perform the one more data transformation operations for different data portions.

13. The method of claim 12, wherein an I/O driver of the host creates the first request, the plurality of requests, and selects the first component, for use in any of the first request and at least one of the plurality of requests, using the mapping information.

14. The method of claim 1, wherein the first indicator indicates that the first component is selected to perform compression and the first request also includes a second indicator indicating that a second of the plurality of components is selected to perform encryption; and the method further comprises:
performing compression by the first component in accordance with the first indicator of the first request; and
performing encryption by the second component in accordance with the second indicator of the first request.

15. A system comprising:
one or more processors; and
a memory comprising code stored thereon that, when executed by at least one of the one or more processors, performs a method of processing I/O operations comprising:
receiving, on a host, a first I/O operation;
determining whether to partition the first I/O operation into a plurality of I/O operations, wherein each of the plurality of I/O operations performs an I/O operation to a different logical address in a target range denoted by the first I/O operation;
responsive to determining not to partition the first I/O operation, performing first processing including:
creating, on the host, a first request for the first I/O operation, the first request including a first indicator identifying a first component of a plurality of components selected to perform, on data of the first I/O operation, one or more data transformation operations including any of encryption, decryption, compression and decompression, wherein the plurality of components include at least one component on the host and at least one component on the data storage system; and
sending, from the host to the data storage system, the first request to perform the first I/O operation; and
responsive to determining to partition the first I/O operation, performing second processing comprising:
creating a plurality of requests for the plurality of I/O operations, wherein each of the plurality of I/O operations includes an indicator identifying one of the plurality of components selected to perform, on data of said each I/O operation, one or more data transformation operations including any of encryption, decryption, compression and decompression; and
sending, from the host to the data storage system, the plurality of I/O operations.

16. A non-transitory computer readable medium comprising code stored thereon that, when executed, performs a method of processing I/O operations comprising:
receiving, on a host, a first I/O operation;
determining whether to partition the first I/O operation into a plurality of I/O operations, wherein each of the plurality of I/O operations performs an I/O operation to a different logical address in a target range denoted by the first I/O operation;
responsive to determining not to partition the first I/O operation, performing first processing including:
creating, on the host, a first request for the first I/O operation, the first request including a first indicator identifying a first component of a plurality of components selected to perform, on data of the first I/O operation, one or more data transformation operations including any of encryption, decryption, compression and decompression, wherein the plurality of components include at least one component on the host and at least one component on the data storage system; and
sending, from the host to the data storage system, the first request to perform the first I/O operation; and
responsive to determining to partition the first I/O operation, performing second processing comprising:
creating a plurality of requests for the plurality of I/O operations, wherein each of the plurality of I/O operations includes an indicator identifying one of the plurality of components selected to perform, on data of said each I/O operation, one or more data transformation operations including any of encryption, decryption, compression and decompression; and
sending, from the host to the data storage system, the plurality of I/O operations.

17. The non-transitory computer readable medium of claim 16, wherein the first component includes any of hardware and software used to perform the one or more data transformation operations.

18. The non-transitory computer readable medium of claim 16, wherein an I/O driver of the host creates the first request and sets the first indicator in the first request.

19. The non-transitory computer readable medium of claim 16, further comprising:
determining a first component set of one or more of the plurality of components, wherein each component of the first component set is capable of performing at least one of the one or more data transformation operations; and
selecting the first component from the first component set.

* * * * *